United States Patent

[11] 3,614,582

| [72] | Inventors | Wilford B. Burkett<br>Pacific Palisades;<br>John H. Bigbee, III, Los Angeles, both of Calif. |
|---|---|---|
| [21] | Appl. No. | 54,244 |
| [22] | Filed | July 13, 1970 |
| [45] | Patented | Oct. 19, 1971 |
| [73] | Assignee | McCulloch Corporation<br>Los Angeles, Calif.<br>Continuation of application Ser. No. 726,060, May 2, 1968. |

[54] RAPID CHARGING OF BATTERIES
20 Claims, 4 Drawing Figs.

[52] U.S. Cl. .................................................. 320/5,
320/11, 320/14, 320/20, 320/39
[51] Int. Cl. .................................................. H02j 7/15
[50] Field of Search .......................................... 320/2, 4, 5,
9, 11, 14, 20–22, 39, 44, 45

[56] References Cited
UNITED STATES PATENTS

| 3,356,922 | 12/1967 | Johnston ...................... | 320/40 X |
| 3,517,293 | 6/1970 | Burkett et al. ................. | 320/14 |
| 3,517,214 | 6/1970 | Ruben .......................... | 320/39 X |
| 3,526,822 | 9/1970 | Dickfeldt et al. .............. | 320/14 |

Primary Examiner—J. D. Miller
Assistant Examiner—John M. Gunther
Attorney—Christie, Parker & Hale ABSTRACT: A battery is charged in a very short period of time by applying a charging current in excess of the nominal 1-hour rate of the battery, with the charging current decreasing as the battery becomes charged. The charging current is intermittently interrupted in response to the attainment of a predetermined voltage by integrating the battery terminal voltage, and the battery is discharged at a high rate for a short period of time. The frequency of the interruptions is increased as the terminal voltage and charge of the battery increases. The disclosure relates to both the method of rapid charging and apparatus for rapid charging.

INVENTORS.
WILFORD B. BURKETT
JOHN H. BIGBEE, III
BY Christie, Parker & Hale
ATTORNEYS.

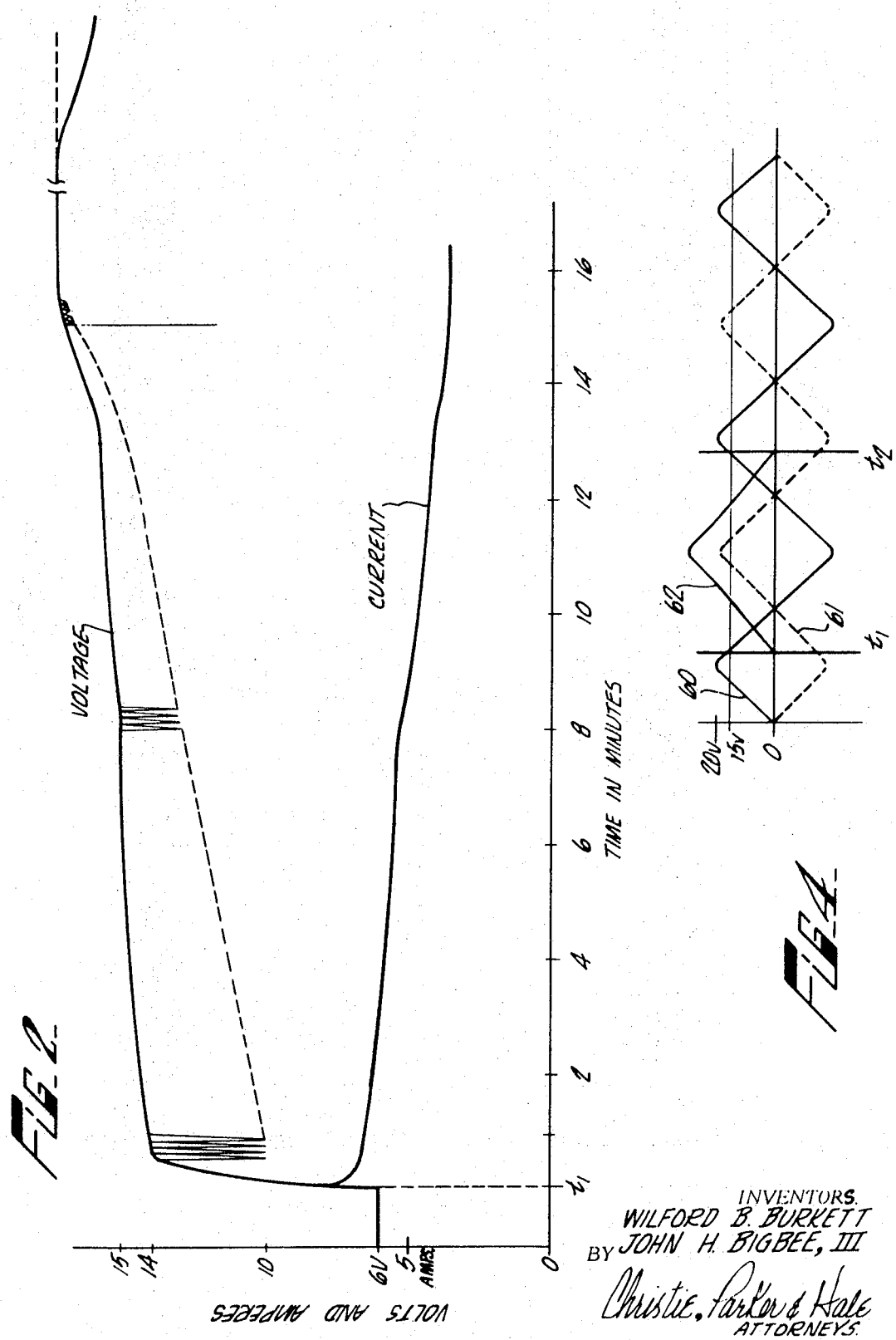

RAPID CHARGING OF BATTERIES

CROSS-REFERENCES TO RELATED APPLICATIONS

The invention herein is related to that disclosed and claimed in the copending U.S. Pat. application Ser. No. 612,995, filed Jan. 31, 1967, and assigned to the same assignee as this application. Additionally, this application is a continuation of copending application Ser. No. 726,060 filed May 2, 1968.

BACKGROUND OF THE INVENTION

1. Field of the Invention

This invention relates to a method and apparatus for quick charging batteries, and is particularly adapted to the charging of batteries in a minimum amount of time. A rapid charging method and apparatus are disclosed in the above referred to application Ser. No. 612,995. In this application it is disclosed that batteries having one or more cells are charged in a very short period of time to rated capacity or greater by subjecting the battery to alternate charge intervals and discharge intervals. During a charge interval a charging current having an amperage in excess of the nominal 1-hour rate of the cells of the battery is transmitted to the battery. This charging current may be pulsating current or continuous direct current. A particular relationship between the charge intervals and the discharge intervals is maintained to prevent damage to the battery during the rapid-charging process.

A particularly advantageous way of rapid charging is to apply a discharge path across the battery upon demand by the battery. This may be accomplished by sensing one of the parameters of the battery that varies as charge progresses. For example, the terminal voltage of the battery may be monitored for controlling the application of a discharge path.

The rapid charging method and apparatus of application Ser. No. 612,995 includes the application of charging current having a value in excess of the "C" rate of the cells of the battery. The C rate of a cell is the nominal rate of discharge current for 1 hour to a selected end voltage, such as 1 volt per cell, or in short, it is the nominal 1-hour rate of the cell as established by the manufacturer.

SUMMARY OF THE INVENTION

Batteries may be rapid charged in accordance with the present invention which includes the method that comprises the steps of applying a charging current to the battery that is in excess of the nominal 1-hour rate of the cells of the battery; integrating the terminal voltage of the battery, which voltage increases as charge progresses; discharging the battery each time a selected threshold voltage is reached in the integrating circuit, and repeating the steps to progressively charge the battery.

Further, in accordance with the present invention batteries are charged in a very short time by employing an apparatus for charging that includes a first controllable switch, a source for supplying charging current coupled to the battery through said first switch, a second controllable switch, a discharge path coupled to the battery through said second switch, an integrating circuit for integrating the voltage across the battery, and means responsive to the integrating circuit for controlling the operation of said switches.

The apparatus may further include a means for sensing the average current on discharge for terminating the charge, or for converting to a trickle charge, and some other means for terminating the charge.

BRIEF DESCRIPTION OF THE DRAWINGS

The above and other features and advantages of the present invention may be understood more clearly and fully upon consideration of the following specification and drawings in which:

FIG. 2 is a graph showing the variations in terminal voltage and charging current as a result of the application of the present invention;

FIG. 4 is a graph showing the time relationship of the voltages across the secondary of the transformer and the discharge current pulse in the apparatus of FIG. 3.

DESCRIPTION OF THE PREFERRED EMBODIMENT

Figure 1:
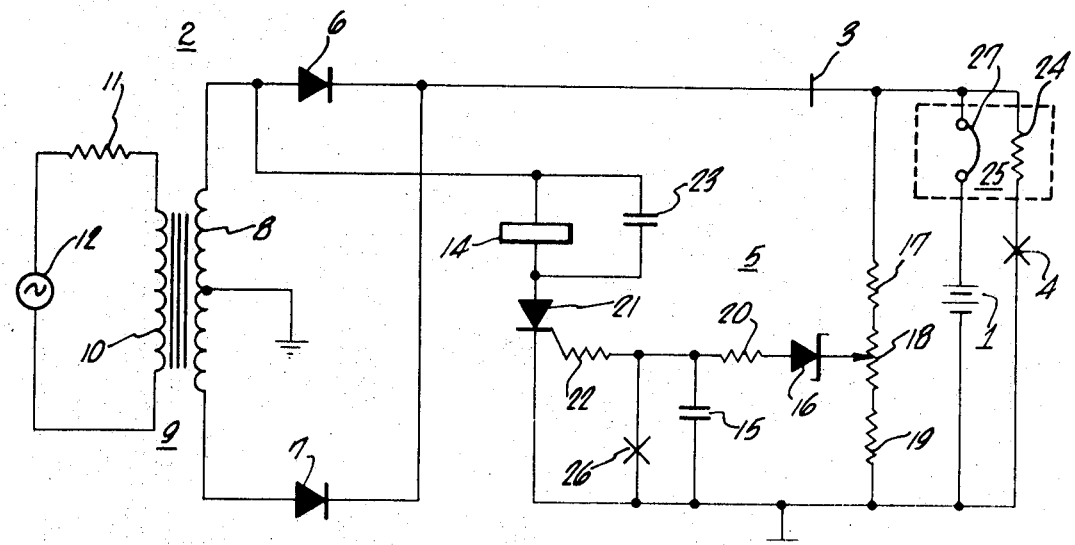
FIG. 1 is a schematic circuit diagram of an apparatus for quick charging a battery in accordance with the present invention.

In the majority of the applications where batteries are employed as the power source, it is desirable to charge the batteries in the shortest possible time. A schematic circuit diagram of a preferred apparatus for charging batteries in a very short period of time with minimum increase in battery temperature, in accordance with the present invention, is shown in FIG. 1.

The present invention will be described by using a typical Sub-C sealed nickel-cadmium cell, as an example, but it is to be understood to be applicable to the charging of any cell or any battery employing a plurality of secondary cells. A Sub-C nickel-cadmium cell, such as the one used in battery 41 B001KD6 manufactured by the General Electric Company has a nominal voltage of 1.2 volts per cell, and a nominal capacity of 1 ampere hour, based upon a C rate or discharge rate of 1 ampere for 1 hour to an end voltage of 1 volt. The manufacturer recommends that this cell be charged at the C/10 rate or at 100 milliamperes for a period of 16 hours. This time is excessive as this cell can be recharged in considerably less time than the recommended 16 hours by employing the method of the present invention.

The method of the present invention of quick charging such a sealed cell can be advantageously employed to charge the cell to greater than its nominal rated capacity in less than 15 minutes and to approximately its rated capacity in approximately 10 minutes.

All secondary cells, in general, have a certain charge efficiency, which is a measure of the amount of usable energy out of the cell for a given amount of energy put into the cell. For example, a typical Sub-C sealed nickel-cadmium cell has a rated capacity of 1.0 ampere-hours or 3,600 ampere-seconds, at a discharge rate of 100 milliamperes. The rated capacity and the usable energy available is less for higher discharge rates. If 80 percent of the rated capacity or 2,880 ampere-seconds are put back into a completely discharged Sub-C cell and the cell thereafter delivers 2,592 ampere-seconds at the discharge rate at which it was rated, its charge efficiency would be 90 percent.

By employing the method of the present invention it is possible to get a very high charge efficiency and to charge the cell in a very short period of time.

The voltage at the terminals of the battery and the charging current applied to the battery in accordance with the method of the present invention are shown in the chart of FIG. 2. For purposes of illustration, it is assumed that the battery to be charged comprises ten cells having a nominal voltage of 1.2 volts per cell and was discharged to an end voltage of 6 volts and this is the terminal voltage at the time charge is initiated at time $t_1$, as shown on FIG. 2. At time $t_1$, a charging current that is seven to eight times the nominal 1-hour rate of the battery is applied to the battery. Thereafter, the terminal voltage of the battery very rapidly rises from about 6 volts to approximately 14 volts.

In accordance with the method of the present invention, the charging current is interrupted for a very short time and a high discharge current is drawn from the battery when a selected threshold voltage is reached in an integrating circuit which integrates the battery terminal voltage. For the type Sub-C cell the discharge current will have a typical peak value of 25 amperes, which is substantially greater than the nominal 1-hour rate of the battery.

The interruptions in the charging current are not shown on the current curve of FIG. 2 since these interruptions in the illustrative example initially occur about every 2 seconds and would not be discernible on the current curve because of the time base for the curves of FIG. 2. However, the initial repetition rate of approximately 2 seconds, although not accurately shown, is representatively shown on the voltage curve of FIG. 2.

As the battery charges and the terminal voltage increases, the interruptions occur more frequently. For example, in this illustrative example, the frequency of the interruptions increases from approximately two per second after 8 minutes of charge, to approximately four per second after 15 minutes of charge. It is seen from the voltage curve in FIG. 2 that as the battery approaches its fully charged condition there is a very rapid rise in terminal voltage. For the illustrative example shown in FIG. 2, the rapid rise occurred between 13 and 15 minutes after charging was initiated. When the battery was essentially fully charged, the terminal voltage of the battery remained substantially constant.

As the state of charge of the battery increases and the terminal voltage increases, the time average current applied to the battery decreases. For the illustrative example in FIG. 2 of a 10-cell battery discharged to an end voltage of approximately 6 volts, the charging current was initially seven to eight times the nominal 1-hour rate of the battery and quickly decreases to a value that is approximately five to six times the nominal 1-hour rate of the battery and remains at this level for approximately 8 minutes. Thereafter, the charging current gradually decreases to a value of four to five times the nominal 1-hour rate of the battery, with a companion change in rate of increase of terminal voltage.

The curves of FIG. 2 are typical for 10 type Sub-C cells connected in series to form a battery. These curves show a delivered charge of approximately 4,000 amp-seconds after 15 minutes of charging. This value is 111 percent of the manufacturer's rated capacity of such a battery attained after the C/10 charging rate has been applied for 16 hours as recommended by the manufacturer. Thus, it is seen that by employing the method of the present invention a battery can be charged to greater than rated capacity in less than 15 minutes.

A battery charger for quick charging a cell or a battery in accordance with the present invention, is shown in FIG. 1 in schematic form. A source 2 for the battery charger provides direct current to the battery 1 and in the circuit of FIG. 1 includes a fullwave rectifier having diodes 6 and 7 connected at opposite ends of a center-tapped transformer winding 8 of a transformer 9. The primary 10 of the transformer is connected through a series resistor 11 to a source of alternating current 12.

The output of the full-wave rectifier will be a pulsating direct current, and is applied to the battery 1 through a series connected switch 3. Switch 3 comprises a pair of relay contacts which are normally closed when the associated relay winding 14 is unactivated.

The charging current to the battery 1 is interrupted through the action of a controlling means 5 which in the circuit of FIG. 1 is a relaxation oscillator. The relaxation oscillator 5 includes a capacitor 15 and its series resistive circuit, connected as an integrating circuit oscillator. A voltage divider comprising resistors 17 and 19 and a potentiometer 18 connected in series, is connected across battery 1 through the contacts of a thermal switch 25 and applies to a portion of the battery terminal voltage to the integrating circuit including capacitor 15. The series resistive circuit of the integrating circuit includes a Zener diode 16 connected through a resistor 20 to one terminal of the capacitor 15. The oscillator further includes a silicon-controlled rectifier 21 having its gate electrode connected to the capacitor 15 through a resistor 22. The current path through the rectifier 21 is from one end of the secondary 8 of the transformer 9 through the parallel combination of a capacitor 23 and the winding of relay 14, through rectifier 21, and back to the center tap of the secondary 8 of the transformer 9 through ground common.

Relay 14 has three contacts, two of which are normally open and one of which is normally closed when the relay is unactivated. The normally closed contacts are the already mentioned switch 3. The normally open contacts are contacts 4 connected across the terminals of the battery 1 through the heating element 24 and circuit-breaking bridge 27 of thermal switch 25. The other normally open contact 26 of relay 14 is connected across timing capacitor 15 of the oscillator 5.

As the terminal voltage of the battery increases, as shown in the curve of FIG. 2, upon the application of charging current, capacitor 15 begins to charge because of the leakage current through Zener diode 16. When the voltage across the capacitor 15 increases to the threshold voltage required to gate rectifier 21 "on," a current path is provided through the rectifier 21 so that relay 14 becomes energized. Upon energization of relay 14 contact 3 opens and contacts 4 and 26 close. The opening of contact 3 interrupts the charging of the battery 1 by disconnecting the charging path. The closing of contact 4 completes a discharge path for the battery 1 through the heating element 24 of the thermal switch 25.

Upon the closing of the discharge path for the battery 1 the battery discharges to enhance its rechargeability. Additionally, upon the energization of relay 14 and the closing of switch 26, the timing capacitor 15 is shorted to provide a discharge path for the capacitor 15 to remove the bias voltage on the gate of the rectifier 21 so that the rectifier will go into its nonconductive state during the negative half cycle of the voltage across the upper half of the secondary 8 of the transformer 9. The relay 14 remains energized for a period of time however because of the charge on the capacitor 23 which discharges through the relay 14. The relay remains energized for more than a half cycle of the input voltage. The size of the capacitor 23 and the resistance of winding 14 will determine the length of time the discharge path is applied to the battery 1 for discharging the battery in preparation for the next application of charging current.

A battery charger having the configuration shown in FIG. 1 was used in developing the voltage and current curves shown in FIG. 2.

The charging of the battery may be terminated by use of any one number of methods. In the charger of FIG. 1, the charging is terminated by the operation of thermal switch 25 which has a circuit-breaking bridge 27 connected in the charge and discharge path of the battery 1. As the charging of the battery 1 progresses, the terminal voltage of the battery will reach a higher voltage in a given amount of time. As the terminal voltage of the battery increases to this higher voltage in a given amount of time, the timing capacitor 15 of the oscillator 5 will attempt to charge to this higher voltage and will thus have a steeper charging curve. Additionally, this higher voltage will cause the resistance of Zener diode 16, which acts as a variable resistor, to decrease the series resistance in the path of capacitor 15. As a result, the timing capacitor 15 charges to the threshold voltage required to gate rectifier 21 "on" in a shorter period of time so that the charging of the battery is interrupted more frequently as the charging of the battery progresses. Consequently, the discharge path is coupled to the battery more frequently so that there will be a higher effective current flowing through the heating element 24 of the thermal switch 25. This higher effective current will cause the thermal switch to operate to open the charge and discharge path to the battery 1 to terminate the charge. The thermal switch may then be manually reset in preparation for charging another battery.

Figure 3:
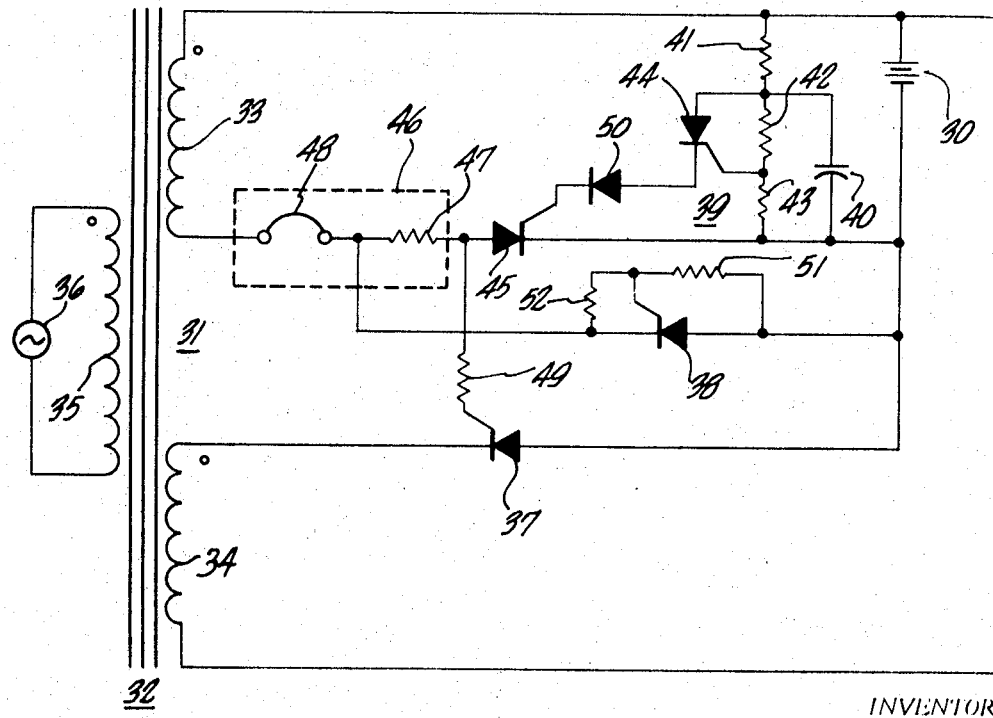
FIG. 3 is a schematic circuit diagram of an alternative apparatus for quick charging a battery in accordance with the present invention.

An alternative embodiment of the apparatus for rapid charging a battery is shown in FIG. 3. The battery charger of FIG. 3 does not employ the relatively slow electromechanical relay that is employed in the charger of FIG. 1, but instead includes electronic switches which have a relatively fast response.

A battery 30 is charged by the charger of FIG. 3, which includes a source 31. Source 31 includes a full-wave rectifier connected across the output terminals of a transformer 32. Transformer 32 has two secondary windings 33 and 34 and one primary winding 35. The primary winding 35 is connected to a source of alternating-current voltage 36.

The windings 33, 34, and 35 are shown with the conventional dot method of designating the relative polarities of the instantaneous voltages on the respective windings. In accordance with the dot method, the end of the secondary windings 33 and 34 having the dots will have the same instantaneous polarity as the end of the primary winding 35 having the dot. Thus, in FIG. 3 the top terminals of secondaries 33 and 34 will have the same instantaneous voltage polarity with respect to their respective bottom terminals.

The top terminal of secondary winding 33 and the bottom terminal of the secondary winding 34 are each connected directly to the positive terminal of the battery 30.

The rectifiers for the rectification of the alternating-current voltage, to provide direct current for the charging of the battery 30, are silicon-controlled rectifier 37, connected to the top terminal of secondary winding 34 and silicon-controlled rectifier 38, connected to the bottom terminal of secondary winding 33 through bimetallic contact or circuit-breaking bridge 48 of a thermal switch 46.

In addition to the full-wave rectifier the charger of FIG. 3 includes a circuit which operates as a relaxation oscillator 39. The timing circuit of the oscillator 39 includes a capacitor 40 and a voltage divider network of series resistors 41, 42, and 43. The series connection of resistors 41, 42, and 43 is connected directly against the terminals of the battery 30, with capacitor 40 being connected between the junction of resistors 41 and 42 and the negative terminal of battery 30. Resistors 41, 42, and 43 and capacitor 40 form an integrating circuit where the capacitor 40 attempts to charge to the portion of the increasing battery terminal voltage that appears across resistor 42 and 43.

The oscillator 39 further includes a switch or silicon-controlled rectifier 44. The output of the oscillator 39 controls another switch, which is shown as being a silicon-controlled rectifier 45, the cathode of which is connected to the negative terminal of the battery 30. The function of silicon-controlled rectifier 45 is to apply a discharge path to the battery 30 to intermittently discharge the battery during the charging operation. The discharge current from the battery 30 that flows through the silicon-controlled rectifier 45 goes through a thermal switch 46 which has a heating element 47 and a bimetallic contact 48.

The gate of rectifier 37 is connected to the junction between the anode of the silicon-controlled rectifier 45 and the heating element 47 of switch 46 through a resistor 49. The gate of silicon-controlled rectifier 45 is connected to the cathode of the silicon-controlled rectifier 44 of the oscillator 39 through a diode 50. The gate of silicon-controlled rectifier 38 is connected to its anode through a resistor 51 and to its cathode through a resistor 52. Silicon-controlled rectifier 38 could be replaced by a diode.

The charger of FIG. 3 operates similarly to the charger of FIG. 1, wherein the charging current is interrupted throughout the charging operation with the interruptions increasing in frequency as the charging progresses. The operation of the charger of FIG. 3 is as follows.

Upon the application of a voltage from source 36 to the primary 35 of transformer 32, current will begin to flow through one of the secondary windings 33 and 34 depending upon the condition of the associated switch in the current path and the condition of the battery 30. Assuming that the polarity of the voltage across the secondaries 33 and 34 is such that the voltage is positive at the ends where the dots are positioned and the voltage is greater than the voltage of the battery 30, current will flow from the top of secondary 33 through battery 30, through silicon-controlled rectifier 38, and through contact 48 to the bottom terminal of the secondary 33 after silicon-controlled rectifier 38 is gated "on." Silicon-controlled rectifier 38 will be gated "on" by current flow through resistors 51 and 52.

When the polarity of the voltage at the terminals of secondaries 33 and 34 is reversed, there will be a positive voltage at the bottom terminal 33 and consequently at the gate of rectifier 37 with respect to the cathode of rectifier 37 so that the rectifier 37 will be gated "on" and charging current will flow from the secondary 34 through the battery 30 and the silicon-controlled rectifier 37 back to the top terminal of secondary winding 34.

Thus, when the voltage across the secondaries 33 and 34 are greater than the terminal voltage of the battery 30, charging current will flow. This charging current will continue to flow until the terminal voltage of the battery 30 increases to the point where the timing capacitor 40 reaches a level that gates silicon-controlled rectifier 44 "on." When the silicon-controlled rectifier 44 is gated "on" current will flow through the diode 50 into the gate terminal of silicon-controlled rectifier 45 to close the discharge path for the battery 30. When silicon-controlled rectifier 45 is gated "on" the discharge path for the battery 30 will be from its positive terminal through secondary winding 33, thermal switch 46, silicon-controlled rectifier 45, back to the negative terminal of the battery 30.

The waveforms of the voltage across the secondaries 33 and 34 and the discharge current pulse when silicon-controlled rectifier 45 is gated "on" are shown in FIG. 4. Voltage curve 60 is the voltage across secondary 33 and voltage curve 61 is the voltage across secondary 34 with the polarity of the voltage being shown at the terminal with the dot.

It is assumed for purposes of illustration in FIG. 4 that the battery terminal voltage has increased to approximately 15 volts, and the charging current thus flows into the battery when the voltage across the secondaries 33 and 34 exceeds 15 volts. For purposes of illustration it is assumed that the peak value of the secondary voltage is 20 volts so that the charging current will flow and the battery will become charged.

It is assumed for the curves of FIG. 4 that the timing capacitor 40 of the oscillator 39 has charged to the point where the silicon-controlled rectifier 44 is gated "on." With the silicon-controlled rectifier 44 gated "on," current will flow through diode 50 into the gate of silicon-controlled rectifier 45. Silicon-controlled rectifier 45 will be gated "on" providing the voltage on the anode is positive with respect to the cathode of rectifier 45. The voltage on the anode with respect to the cathode of rectifier 45 is the combination of the voltage drop across heating element 47, the potential across secondary 33 and the terminal voltage of the battery 30. While the voltage at the output of the secondary 33 of the transformer 32 is greater than the terminal voltage of the battery, the anode of rectifier 45 will be negative with respect to the cathode so that rectifier 45 will not be turned on. However, as the voltage across the secondary 33 decreases below the terminal voltage of the battery, which point is marked $t_1$ in FIG. 4, the rectifier 45 will be forward biased and will turn on to provide the discharge path for the battery 30. Discharge current shown as curve 62 in FIG. 4 will begin to flow through rectifier 45 and will increase as the voltage on secondary 33 decreases below the terminal voltage of the battery. As the polarity of the voltage on transformer 33 reverses, the voltage will aid the battery voltage to increase the current and it will increase in the illustrative example, to a value of approximately 25 ampere peak.

During the discharging portion of the charging process it is necessary to prevent rectifier 37 from turning on because if it turned on while discharge silicon-controlled rectifier 45 is on there would be essentially a short circuit across the secondaries 33 and 34, and the transformer 32 as well as some of the components of the charger could be damaged. To prevent rectifier 37 from turning on, its gate electrode is connected to the junction between heating element 47 and discharge rectifier 35 such that as the discharge current through the heating element 47 increases, the gate potential never gets high enough to turn rectifier 37 on. The discharge rectifier 45 will remain "on" until the potential output of secondary 33 becomes greater than the terminal voltage of the battery and reverse biases the rectifier 45. This occurs at time $t_2$ as shown in FIG. 4.

To provide for proper operation of the discharge circuitry winding 33 is made slightly larger than winding 34 such that the voltage appearing across winding 33 is slightly greater than the voltage across winding 34. In this way silicon-controlled rectifier 44 will always be gated "on" when the charging current is being provided by winding 33 to give the proper phase relationship.

Various changes may be made in the details of construction without departing from the spirit and scope of the appended claims.

What is claimed is:

1. A method of rapidly charging a battery comprising the steps of alternately charging and discharging a battery during alternated charging and discharging intervals to impose an increasing charge on said battery; and maintaining the duration of each said charging intervals by integrating the battery terminal voltage.

2. A battery-charging circuit comprising a source of charging current coupled to a battery through a selectively operable electrical connection; a discharge path; circuit means for developing a control signal by integrating the terminal voltage of said battery, with said battery terminal voltage increasing as charging of said battery progresses; and circuit means responsive to said control signal for connecting said discharge path.

3. A method of rapidly charging batteries for one or more cells comprising the steps of applying charging current to the battery during a charging interval, integrating the battery terminal voltage which increases as charge progresses to provide a control signal at a selected threshold voltage to end each charge interval and to start a discharge interval and discharging the battery during each discharge interval after a charge interval.

4. A method in accordance with claim 3 comprising the further step of terminating the rapid charging when a predetermined average discharge current is reached.

5. The method in accordance with claim 3 wherein the charging current exceeds the nominal 1-hour rate of the cells of the battery and the average discharge current averaged over the time of discharge current flow exceeds the value of the charge current.

6. Apparatus for rapid charging a battery comprising a first controllable switch, a source for supplying charging current coupled to said battery through said first switch, a second controllable switch, a discharge path coupled to said battery through said second switch, circuit means for integrating the battery terminal voltage, and circuit means responsive to a selected threshold voltage in the integrating means for closing said second switch to apply said discharge path.

7. An apparatus in accordance with claim 6 wherein the controlling means includes a relay winding, the first controllable switch is a pair of normally closed contacts associated with the relay winding and said second switch includes a pair of normally opened contacts associated with said relay winding.

8. An apparatus in accordance with claim 6 wherein the first controllable switch is a silicon-controlled rectifier.

9. An apparatus in accordance with claim 6 wherein the second controllable switch is a silicon-controlled rectifier.

10. An apparatus in accordance with claim 6 wherein the closing means includes a relaxation oscillator.

11. An apparatus in accordance with claim 6, further comprising a thermal-responsive switch for opening the current path from the source to the battery, the heat element of said thermal-responsive switch being in the discharge path of said battery.

12. An apparatus for rapid charging a battery having one or more cells comprising transmission means operable to transmit charging current to said battery, a discharge path, means for integrating the terminal voltage of the battery, and means responsive to a selected voltage across the integrating means for applying the discharge path to the battery.

13. An apparatus in accordance with claim 12 wherein the applying means is controllable to provide a selected period of time for the application of the discharge path.

14. An apparatus for rapid charging a battery having one or more cells comprising an integrating circuit connected across the battery, the integrating circuit including a capacitor having a charge rate responsive to the terminal voltage of the battery, a discharge path, a first switch responsive to a selected threshold voltage across the capacitor, and circuit means controlled by said first switch for applying said discharge path across said battery.

15. An apparatus for rapid charging a battery having one or more cells comprising a source of charge current, a normally closed contact or an electromechanical relay connected between said source and said battery, a discharge path, a normally open contact of said electromechanical relay connecting said discharge path across said battery, a voltage divider circuit connected across said battery, an integrating circuit including a capacitor connected between a junction in the voltage divider network and the negative terminal of said battery, an electromechanical relay having a capacitor connected across its winding, a silicon-controlled rectifier being connected in series with the relay winding between a source of voltage and the negative terminal of the battery, and means for connecting the capacitor of the integrating circuit between the gate and cathode of said silicon-controlled rectifier.

16. An apparatus for rapid charging a battery comprising a source of alternating-current voltage, a transformer having two secondary windings, a first silicon-controlled rectifier, means for connecting one secondary winding across said battery through said first silicon-controlled rectifier, a second silicon-controlled rectifier, means for connecting said battery to said second winding of said transformer through said second silicon-controlled rectifier, a third silicon-controlled rectifier connected in series with a resistor between one terminal of said second winding and the negative terminal of said battery, an integrating circuit including a capacitor in parallel with a voltage divider network and connected across said battery, a fourth silicon-controlled rectifier connected between one terminal of said capacitor and the gate terminal of said silicon-controlled rectifier, means for connecting the gate terminal of said fourth silicon-controlled rectifier to a junction of said voltage divider and means for connecting the gate terminal of said first silicon-controlled rectifier to the junction between the series resistor and said third silicon-controlled rectifier.

17. A method of rapidly charging a battery comprising the steps of alternately charging and discharging a battery during alternating charging and discharging intervals to impose an increasing charge on said battery; sensing a condition by integrating the terminal voltage of said battery; maintaining the duration of each of said charging intervals as a function of the time integral of battery terminal voltage; interrupting said charging of said battery at the ends of said charging intervals, with said battery terminal voltage increasing as charging of said battery progresses; limiting said discharging intervals such that the difference between maximum and minimum battery terminal voltages during discharging intervals diminishes as charging of said battery progresses; diminishing the level of current applied to said battery to effect said charging as charging of said battery progresses; effecting said charging with charge current exceeding the nominal 1-hour rate of the cells of said battery; causing the frequency of the intervals of the discharging to increase as said alternate charging and discharging progresses; causing the duration of intervals of said charging to diminish as said alternate charging and discharging progresses; and causing the quotient of the duration of a charging interval divided by the duration of an immediately succeeding discharging interval to diminish as said alternate charging and discharging progresses.

18. A method of rapidly charging a battery comprising the steps of alternately charging and discharging a battery during alternating charging and discharging intervals to impose an increasing charge on said battery; sensing a condition by integrating the terminal voltage of said battery; maintaining the duration of each of said charging intervals as a function of the time integral of battery terminal voltage; interrupting said charging of said battery at the ends of said charging intervals in response to said sensed condition, with battery terminal voltage increasing as charging of said battery progresses; limiting the duration of said discharging intervals such that the difference between maximum and minimum battery terminal voltages during discharging intervals diminishes as charging of said battery progresses; diminishing the level of current applied to said battery during said charging intervals as charging of said battery progresses; effecting said charging with charge current exceeding the rated hourly capacity of said battery; effecting said discharging with discharge current exceeding the charging current applied during the initial charging interval of said battery; causing the frequency of the intervals of discharging to increase as said alternate charging and discharging progresses; causing the duration of intervals of said charging to diminish as said alternate charging and discharging progresses; and causing the quotient of the duration of a charging interval divided by the duration of an immediately succeeding discharging interval to diminish as said alternate charging and discharging progresses.

19. A battery-charging circuit comprising a source of charging current; a load; means for generating a control signal; said generating means including a means for integrating the battery terminal voltage; circuit means for alternately connecting said battery to said source and to said load; said circuit means being responsive to said control signal; said control means being operable to cause the difference between maximum and minimum battery terminal voltages, during the periods of time that said battery is connected to said load, to diminish as charging of said battery progresses; said circuit means being operable to impose a charging current on said battery which decreases as charging of said battery progresses; said circuit means being operable to connect said load with said battery with a frequency which increases as charging of said battery progresses, with battery terminal voltage increasing as charging of said battery progresses; said circuit means being operable to connect said source with said battery, with the duration of periods of connection between said battery and said source becoming shorter as charging of said battery progresses; and said circuit means being operable to cause a quotient equal to the duration of a period of time during which said source is connected to said battery divided by the duration of an immediately succeeding period of time during which said load is connected to said battery to diminish as charging of said battery progresses.

20. A battery-charging circuit comprising a source of charging current; a load; means for generating a control signal; said signal being an integral function of the terminal voltage of a battery, with said battery terminal voltage increasing as charging of said battery progresses; circuit means for alternately connecting said battery to said source and to said load; said circuit means being responsive to said control signal; said control means being operable to cause the difference between maximum and minimum battery terminal voltages, during the periods of time that said battery is connected to said load, to diminish as charging of said battery progresses; said circuit means being operable to impose a charging current on said battery which decreases as charging of said battery progresses; said circuit means being operable to connect said source with said battery, with the duration of periods of connection between said battery and said source becoming shorter as charging of said battery progresses, and with current applied to said battery exceeding the hourly rated capacity of said battery; said circuit means being operable to connect said load with said battery with a frequency which increases as charging of said battery progresses, and with current discharging from said battery at a level which exceeds the current applied to said battery when said source is first connected to said battery; and said circuit means being operable to cause a quotient equal to the duration of a period of time during which said source is connected to said battery divided by the duration of an immediately succeeding period of time during which said load is connected to said battery to diminish as charging of said battery progresses.

UNITED STATES PATENT OFFICE
CERTIFICATE OF CORRECTION

Patent No. 3,614,582          Dated October 19, 1971

Inventor(s) Wilford B. Burkett et al.

It is certified that error appears in the above-identified patent and that said Letters Patent are hereby corrected as shown below:

Column 2, line 24, "BO01KD6" should read -- BO01KD06 --.
Column 8, line 11, "or" should read -- of --.

Signed and sealed this 13th day of June 1972.

(SEAL)
Attest

EDWARD M. FLETCHER, JR.          ROBERT GOTTSCHALK
Attesting Officer                Commissioner of Patents